US008200957B1

(12) United States Patent
Mukerji et al.

(10) Patent No.: US 8,200,957 B1
(45) Date of Patent: *Jun. 12, 2012

(54) USING SYN-ACK COOKIES WITHIN A TCP/IP PROTOCOL

(75) Inventors: Arindum Mukerji, Seattle, WA (US); Jesse Abraham Rothstein, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,111

(22) Filed: Mar. 4, 2011

Related U.S. Application Data

(63) Continuation of application No. 11/925,157, filed on Oct. 26, 2007, now Pat. No. 7,921,282.

(60) Provisional application No. 60/965,619, filed on Aug. 20, 2007.

(51) Int. Cl.
- H04L 29/06 (2006.01)
- H04L 9/00 (2006.01)
- G06F 7/04 (2006.01)

(52) U.S. Cl. ........ 713/151; 713/152; 713/153; 713/168; 713/169; 713/170; 726/3; 726/4; 726/5; 726/6; 726/7

(58) Field of Classification Search .................... 713/151
See application file for complete search history.

(56) References Cited

U.S. PATENT DOCUMENTS

| 6,981,014 | B2 | 12/2005 | Jayam et al. | |
|---|---|---|---|---|
| 7,675,854 | B2 | 3/2010 | Chen et al. | |
| 7,921,282 | B1 * | 4/2011 | Mukerji et al. | 713/151 |
| 2007/0195792 | A1 * | 8/2007 | Chen et al. | 370/395.52 |

OTHER PUBLICATIONS

"Transmission Control Protocol—DARPA Internet Program Protocol Specification", Information Sciences Institute, Marina del Rey, California, Sep. 1981, 84 pages http://tools.ietf.org/html/rfc793, accessed May 14, 2007.
Ramakrishnan, K. et al., "The Addition of Explicit Congestion Notification (ECN) to IP", Network Working Group, Sep. 2001, 49 pages http://www.apps.ietf.org/rfc/rfc3168.html, accessed May 14, 2007.
Stevens, W., "TCP Slow Start, Congestion Avoidance, Fast Retransmit, and Fast Recovery Algorithms", Network Working Group, Jan. 1997, 5 pages http://www.apps.ietf.org/rfc/rfc2001.html, accessed May 14, 2007.
Jacobson, V. et al., "TCP Extension for High Performance", Network Working Group, Request for Comments 1323. May 1992, 31 pages.

* cited by examiner

*Primary Examiner* — Longbit Chai
(74) *Attorney, Agent, or Firm* — Frommer Lawrence & Haug LLP; Jamie L. Wiegand

(57) ABSTRACT

A method, apparatus, and system are directed toward managing a Transmission Control Protocol/Internet Protocol (TCP/IP) handshake. A SYN-ACK cookie is determined based on a cryptographic operation using a secret key and at least one network characteristic. The SYN-ACK cookie is provided in a SYN message's field. The SYN message is sent from a client to a server. Another sequence number based on the received SYN-ACK cookie is included in a SYN-ACK message. The SYN-ACK message is sent to and received by the client. The other sequence number is validated based on the secret key to generate at least another network characteristic. A TCP/IP connection is established if the network characteristic matches the other network characteristic. In one embodiment, the component sending the SYN message may be a different component than the component receiving the SYN-ACK message. In this embodiment, the secret key may be shared between the two components.

26 Claims, 6 Drawing Sheets

USING SYN-ACK COOKIES WITHIN A TCP/IP PROTOCOL

CROSS-REFERENCE TO RELATED APPLICATIONS

This application is a continuation patent application of U.S. patent application Ser. No. 11/925,157, filed Oct. 26, 2007, entitled "Using SYN-ACK Cookies Within A TCP/IP Protocol," and claims benefit under 35 U.S.C. §120, and which in turn claims priority from provisional application Ser. No. 60/965,619 entitled "Using SYN-ACK Cookies Within A TCP/IP Protocol," filed on Aug. 20, 2007, the benefit of the earlier filing date of which is hereby claimed under 35 U.S.C. §119 (e) and 37 C.F.R. §1.78, and wherein each of which are incorporated herein by reference.

TECHNICAL FIELD

The present invention relates generally to network communications, and more particularly, but not exclusively, to managing a TCP/IP handshake protocol.

BACKGROUND

The TCP/IP handshake protocol has been used with great success in enabling communication over the Internet. However, some drawbacks with the TCP/IP handshake protocol include the lack of strong authentication within the protocol messages, including the SYN message, and the SYN-ACK message. Because state information must be stored by the client and/or server for each new connection, the TCP/IP handshake protocol may be prone to resource exhaustion attacks, such as SYN floods. One solution to this problem is the use of SYN cookies.

A SYN cookie is an initial TCP/IP acknowledgement number determined by a TCP/IP server and sent in packages within the TCP/IP handshake protocol. The SYN cookie includes state information, such as a counter, a maximum segment size for a SYN message, a secret based on the cryptographic hash of an IP address, port number and/or counter, or the like. The state information may be stored in different parts of the SYN cookies. For example, the first five bits of the SYN cookie may include the counter, the next three bits may include an encoding of the maximum segment size, and at least a portion of the remaining bits may include the cryptographic secret. The SYN cookie is sent in the SYN-ACK message sent from the server to the client. The client sends the ACK message back to the server. The ACK message includes the TCP/IP acknowledgement number plus one. The server retrieves the TCP/IP acknowledgement number plus one, and subtracts one from the number. The server thus obtains the SYN cookie from the ACK message. The server is then able to check if the SYN cookie is valid based on the state information stored in the SYN cookie. For example, the server may extract the counter and/or decode the maximum segment size, and the received cryptographic secret. The server may compute another cryptographic secret based on the received counter, the server's IP address, port number, or the like. If the other cryptographic secret matches the received cryptographic secret, then the SYN cookie is determined to be valid and the TCP/IP connection is established.

Generally SYN cookies allow a server to reduce state storage, network resources, or other resources for a possible TCP/IP connection. However, SYN cookies do not address the reduction of state storage by clients. It is with respect to this consideration and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
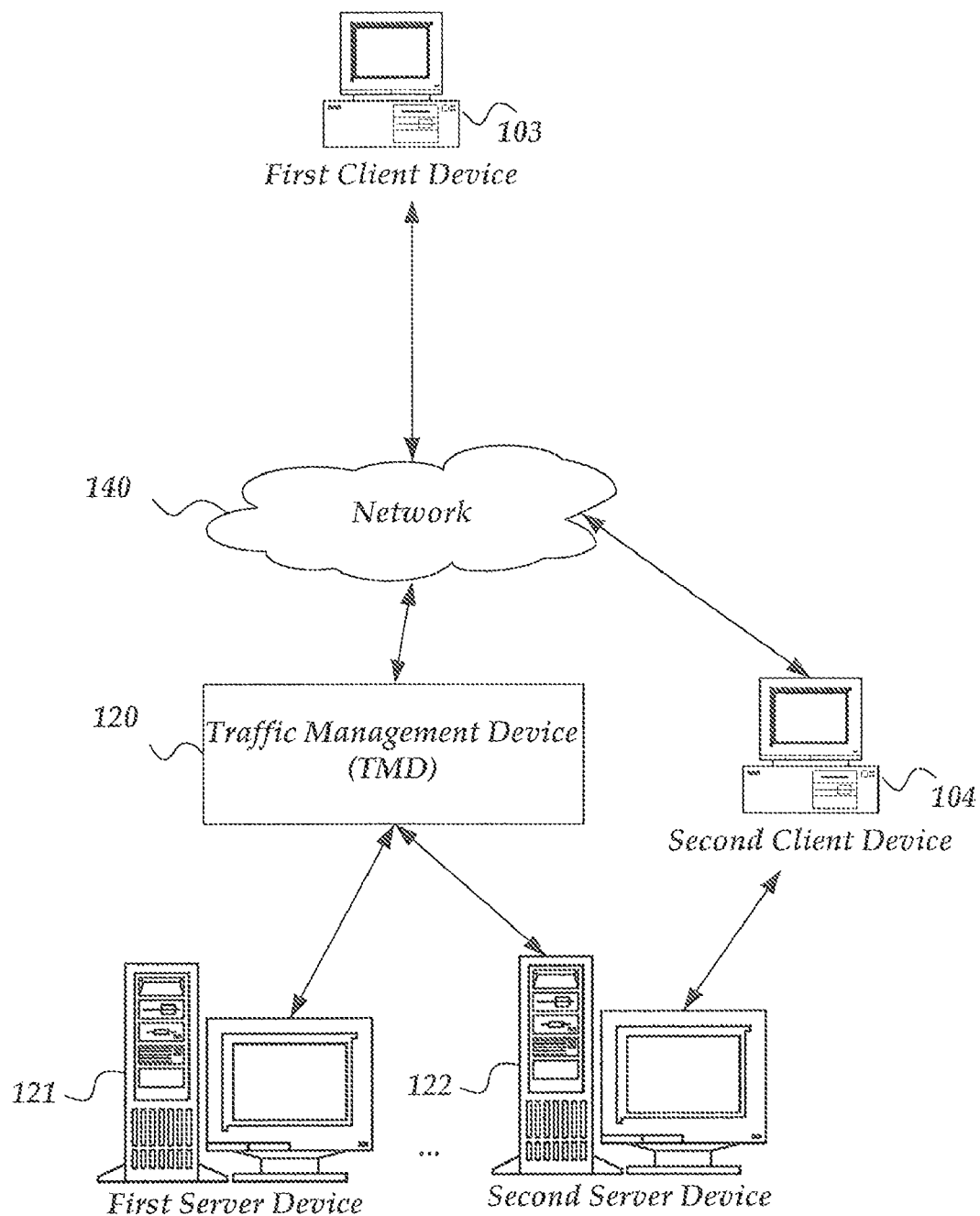
FIG. 1 shows a block diagram illustrating an environment for practicing the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection may be a TCP/IP connection. TCP/IP connections are virtual connections between two network nodes, and are typically established through a TCP/IP handshake protocol. The TCP/IP protocol is described in more detail in Request for Comments (RFC) 793, and/or RFC 1323, which are available through the Internet Engineering Task Force (IETF), and are each herein incorporated by reference.

A network connection "over" a particular path or link refers to a network connection that employs the specified path or link to establish and/or maintain a communication. The term "node" refers to a network element that typically interconnects one or more devices, or even networks.

Briefly, the embodiments of the invention are directed towards systems, computer readable media, and methods for managing a Transmission Control Protocol/Internet Protocol (TCP/IP) handshake using SYN-ACK cookies. A SYN-ACK cookie is determined based on a cryptographic operation using a secret key and at least one network characteristic. The SYN-ACK cookie is provided in a SYN message's sequence number field. The SYN message is sent from a client to a server as part of the TCP/IP handshake protocol. Another sequence number based on the received SYN-ACK cookie is included in a SYN-ACK message. The SYN-ACK message is sent to and received by the client. The other sequence number is validated based on the secret key to generate at least another network characteristic. A TCP/IP connection is established if the network characteristic matches the other network characteristic. In one embodiment, the component sending the SYN message may be a different component than the component receiving the SYN-ACK message. For example, in one embodiment, if an active/sending component fails due to an error, a standby component may be configured to receive the SYN-ACK message and validate the SYN-ACK message. In this embodiment, the secret key is shared between the two components.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes first and second client devices 103-104, network 140, traffic management device (TMD) 120, and first and second server devices 121-122.

Generally, first and second client devices 103-104 may include virtually any computing device capable of connecting to another computing device to send and receive information, including web requests for information from a server device, and the like. One embodiment of a network device that could be used as first and second client devices 103-104 is described in more detail below in conjunction with coupled pair 220 of FIG. 2 and/or network device 300 of FIG. 3. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, first and second client devices 103-104 may be any device that is capable of connecting using a wired or wireless communication medium such as a PDA, POCKET PC, wearable computer, and any other device that is equipped to communicate over a wired and/or wireless communication medium.

First and second client devices 103-104 may further include a client application that is configured to manage various actions. Moreover, first and second client devices 103-104 may also include a web browser application that is configured to enable an end-user to interact with other devices and applications over network 140.

First and second client devices 103-104 may communicate with network 140 employing a variety of network interfaces and associated communication protocols. First and second client devices 103-104 may, for example, use various dial-up mechanisms with a Serial Line IP (SLIP) protocol, Point-to-Point Protocol (PPP), and the like. As such, first and second client devices 103-104 may transfer data at a low transfer rate, with potentially high latencies. For example, first and second client devices 103-104 may transfer data at about 14.4 to about 46 kbps, or potentially more. In another embodiment, first and second client devices 103-104 may employ a higher-speed cable, Digital Subscriber Line (DSL) modem, Integrated Services Digital Network (ISDN) interface, ISDN terminal adapter, or the like. As such, first and second client devices 103-104 may be considered to transfer data using a high bandwidth interface varying from about 32 kbps to over about 622 Mbps, although such rates are highly variable, and may change with technology. Further, first client device 103 may transfer data at a different rate then second client device 104.

Network 140 is configured to couple first and second client devices 103-104, with other network devices, such as TMD 120, or the like. Network 140 is enabled to employ any form of computer readable media for communicating information from one electronic device to another. In one embodiment, network 140 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 140 may further employ a plurality of wireless access technologies including, but not limited to , 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as first and second client devices 103-104, or the like, with various degrees of mobility. For example, network 140 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 140 includes any communication method by which information may travel between one network device and another network device.

Additionally, network 140 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

One embodiment of a network device that could be used as TMD 120 is described in more detail below in conjunction with coupled pair 220 of FIG. 2 and/or network device 300 of FIG. 3. Briefly, however, TMD 120 includes virtually any network device that manages network traffic. Such devices include, for example, routers, proxies, firewalls, load balancers, cache devices, application accelerators, devices that perform network address translation, any combination of the preceding devices, or the like. TMD 120 may control, for example, the flow of data packets delivered to or forwarded from an array of server device devices, such as first and second server devices 121-122. In one embodiment, messages sent between the TMD 120 and the first and second server devices 121-122 may be over a secure channel, such as an SSL connection. Similarly, messages sent between TMD 120 and first and second client devices 103-104 may also be over a secure channel.

TMD 120 may direct a request for a resource to a particular one of first and second server devices 121-122 based on network traffic, network topology, capacity of a server device, content requested, and a host of other traffic distribution mechanisms. TMD 120 may receive data packets from and transmit data packets to the Internet, an intranet, or a local area network accessible through another network. TMD 120 may recognize packets that are part of the same communication, flow, and/or stream and may perform special processing on such packets, such as directing them to the same server device so that state information is maintained. TMD 120 also may support a wide variety of network applications such as Web browsing, email, telephony, streaming multimedia and other traffic that is sent in packets. The BIG-IP® family of traffic managers, by F5 Networks Inc. of Seattle, Wash., are examples of TMDs. TMDs are described in more detail in U.S. Pat. No. 7,102,996 to Amdahl, et al. entitled "Method and System for Scaling Network Traffic Managers," which is incorporated herein by reference. In one embodiment, TMD 120 may be integrated with one or more of first and second server devices 121-122, and provide content or services in addition to the TMD functions described herein.

Further, TMD 120 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

TMD 120 may receive requests from first and second client devices 103-104. TMD 120 may select one or more of the first and second server devices 121-122 to forward the request. TMD 120 may employ any of a variety of criteria and mechanisms to select first and second server devices 121-122, including those mentioned above, load balancing mechanisms, and the like. TMD 120 may receive a response to the request and forward the response to first and second client devices 103-104.

In one embodiment, TMD 120 may be configured to manage a modified Transmission Control Protocol/Internet Protocol (TCP/IP) handshake over network 140. TMD 120 may receive a request for a resource from one of first client device 103 over network 140. The request from first client device 103 may be based on a variety of protocols, including TCP/IP, UDP, Real-Time Streaming Protocol (RTSP), or the like. TMD 120 may determine the recipient of the request (e.g., server 121 and/or server 122) based on, for example, header information in the request. TMD 120 may forward the request to recipient using a variety of mechanisms, including a load-balancing mechanism, protocol-mapping, or the like.

In one embodiment, to forward the request, TMD 120 may determine a SYN-ACK cookie based in part on a cryptographic operation using a secret key and at least one network characteristic and/or other state information about first client device 103, TMD 120, and/or the recipient of the request. TMD 120 may provide the SYN-ACK cookie in a modified SYN message within a TCP/IP handshake protocol. As part of the TCP/IP handshake protocol, first server 121 and/or second server 122 may respond with a SYN-ACK message which may include the SYN-ACK cookie plus one. TMD 120 may verify if information within the received SYN-ACK cookie is validated. In one embodiment, if the SYN-ACK message and/or the SYN-ACK cookie are validated, TMD 120 may complete the initiation of the TCP/IP protocol connection with first server 121 and/or second server 122.

In one embodiment, the validation may ensure that the SYN-ACK message is intended for TMD 120 and/or a client device requesting the connection with the recipient. For example, first server 121 and/or second server 122 may send a wrong SYN-ACK message to TMD 120, because, for example, the servers were malfunctioning, malicious, improperly configured, or the like. The SYN-ACK message may be a SYN-ACK flood, a SYN-ACK intended for a different device (e.g., second client device 104), or the like. In one embodiment, TMD 120 may drop invalid SYN-ACK messages. For valid SYN-ACK messages, TMD 120 may establish a TCP/IP connection. TMD 120 may then forward at least one message between first client device 103 and the recipient (e.g., first server device 121 and/or second server device 122) over the established TCP/IP connection.

Although TMD 120 is shown as a single component, TMD 120 may be distributed among several components, devices, or the like without departing from the scope of the invention. In one embodiment, a first TMD device or component within TMD 120 may forward the modified SYN message to a server, while a second TMD device or component within TMD 120 may receive the SYN-ACK message. The modified TCP handshake protocol may then be established as described above without departing from the scope of the invention.

In an alternate embodiment, second client device 104 may also be configured to manage a modified TCP handshake protocol between second client device 104 and second server 122, as described above in conjunction with TMD 120. Second client device 104 may send the modified SYN message to second server device 122 and may receive the SYN-ACK message (including a possibly valid SYN-ACK cookie) and validate the SYN-ACK message as described above.

First and second server devices 121-122 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by first and second server devices 121-122 may be formatted according to TCP/IP, but they could also be formatted using another transport protocol, such as SCTP, UDP, NetBEUI, IPX/SPX, token ring, similar IPv4/6 protocols, and the like. Moreover, the packets may be communicated between first and second server devices 121-122, TMD 120, and first and second client devices 103-104 employing HTTP, HTTPS, RTSP, or any of a variety of current or later developed protocols.

In one embodiment, first and second server devices 121-122 may be configured to operate as a website server. However, first and second server devices 121-122 are not limited to web server devices, and may also operate a messaging server, a File Transfer Protocol (FTP) server, a database server, content server, and the like. Additionally, each of first and second server devices 121-122 may be configured to perform a different operation. Thus, for example, first server device 121 may be configured as a messaging server, while second server device 122 may be configured as a database server. Moreover, while first and second server devices 121-122 may operate as other than a website, they may still be enabled to receive an HTTP communication, an RTSP communication, as well as a variety of other communication protocols.

Devices that may operate as first and second server devices 121-122 include personal computers, desktop computers, multiprocessor systems, microprocessor-based or programmable consumer electronics, network PCs, server devices, and the like.

It is further noted that terms such as client and server device may refer to functions within a device. As such, virtually any device may be configured to operate as a client device, a server device, or even include both a client and a server device function. As described above, the client device may request the network resource over a TCP/IP connection, and TMD 120 may forward the request to a server device. However, virtually any device may act as a client or a server. In one embodiment, TMD 120 may forward a request from first and second server devices 121-122 to first client device 103 using the modified TCP/IP handshake protocol as described above, without departing form the scope of the invention.

Furthermore, where two or more peers (e.g., second server device 122 and second client device 104) are employed, any one of them may be designated as a client or as a server, and be configured to conform to the teachings of the present invention. Thus, the invention is not to be construed as being constrained to a client/server architecture.

Figure 2:
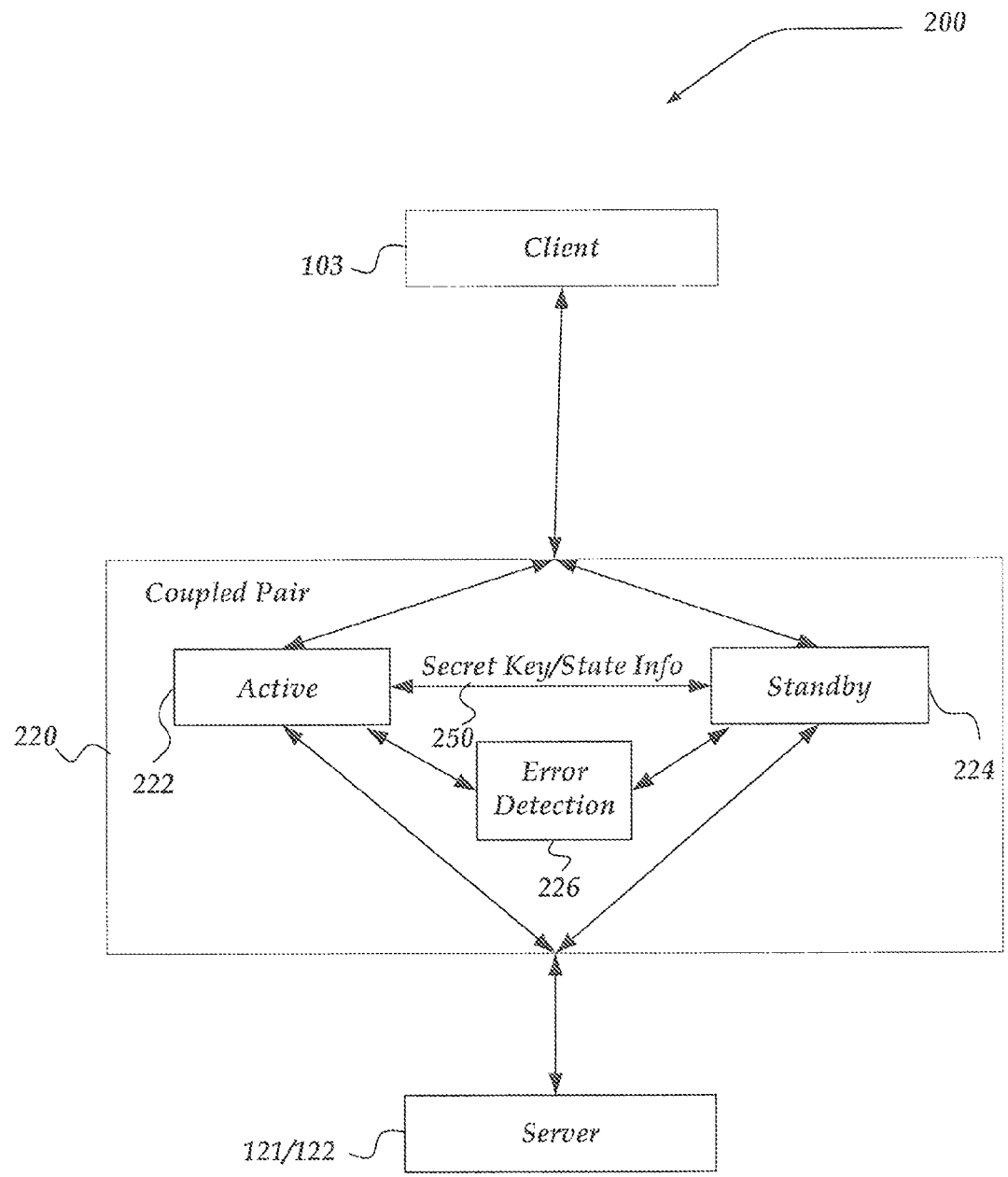
FIG. 2 illustrates one embodiment of failover configuration in which the invention may be employed.

FIG. 2 illustrates one embodiment of high availability or failover configuration in which the invention may be employed. As shown, system 200 of FIG. 2 includes servers 121/122 and first client 103, and coupled pair 220. In one embodiment, coupled pair 220 may provide fail-over and redundancy of network services. For example, coupled pair 220 may provide continuing network services between servers 121/122 and first client 103 even when at least one component of coupled pair 220 fails to operate and/or respond.

In one embodiment, coupled pair 220 may represent TMD 120. In another embodiment, coupled pair 220 may also represent two different TMDs, different Application Specific Integrated Circuit (ASIC)s within a TMD, or the like. In this case, coupled pair 220 forwards modified TCP header information between first client 103 and first server 121 and/or second server 122. In one embodiment, coupled pair 220 includes active (component) 222, standby (component) 224 and error detector 226. These components may be hardware and/or software components. Coupled pair 220 may include many more or less components than those shown. In one embodiment, coupled pair 220 may receive a request to open a TCP/IP connection with one of first and/or second servers 121-122. In one embodiment, coupled pair 220 may route the request to active 222. In another embodiment, coupled pair 220 may route a copy of the request to both active 222 and standby 224. In one embodiment, active 222 may initiate the modified TCP/IP handshake protocol by sending the modified SYN message to servers 121/122 as described above. Additionally, active 222 may also send a secret key and/or other state information to standby 224, over for example, channel 250. The secret key and/or other state information may be used by standby 224 to, for example, confirm that a sequence number received within a SYN-ACK is valid.

In one embodiment, error detector 226 may detect no error, failure, or non-responsiveness from active 222. In this case, error detector 226 enables further processing of the modified TCP/IP handshake protocol by active 222. Active 222 may receive a SYN-ACK message and may validate information within the SYN-ACK message. Active 222 may then initiate a TCP/IP connection with first server 121 and/or second server 122.

In another embodiment, error detector 226 may detect an error within active 222. In this case, error detector 226 may inhibit further processing by active 222, may activate standby 224, select standby 224 to establish the TCP/IP connection, and/or may route information from first server 121 and/or second server 122 through standby 224, or the like. Standby 224 may receive a SYN-ACK message and may validate the information within the SYN-ACK message based on, for example, the received secret key and/or other state information. Standby 224 may establish the TCP/IP connection based on the validity of the information, and may continue to act as a forwarding agent between client 103 and first server 121 and/or second server 122.

Illustrative Network Device

Figure 3:
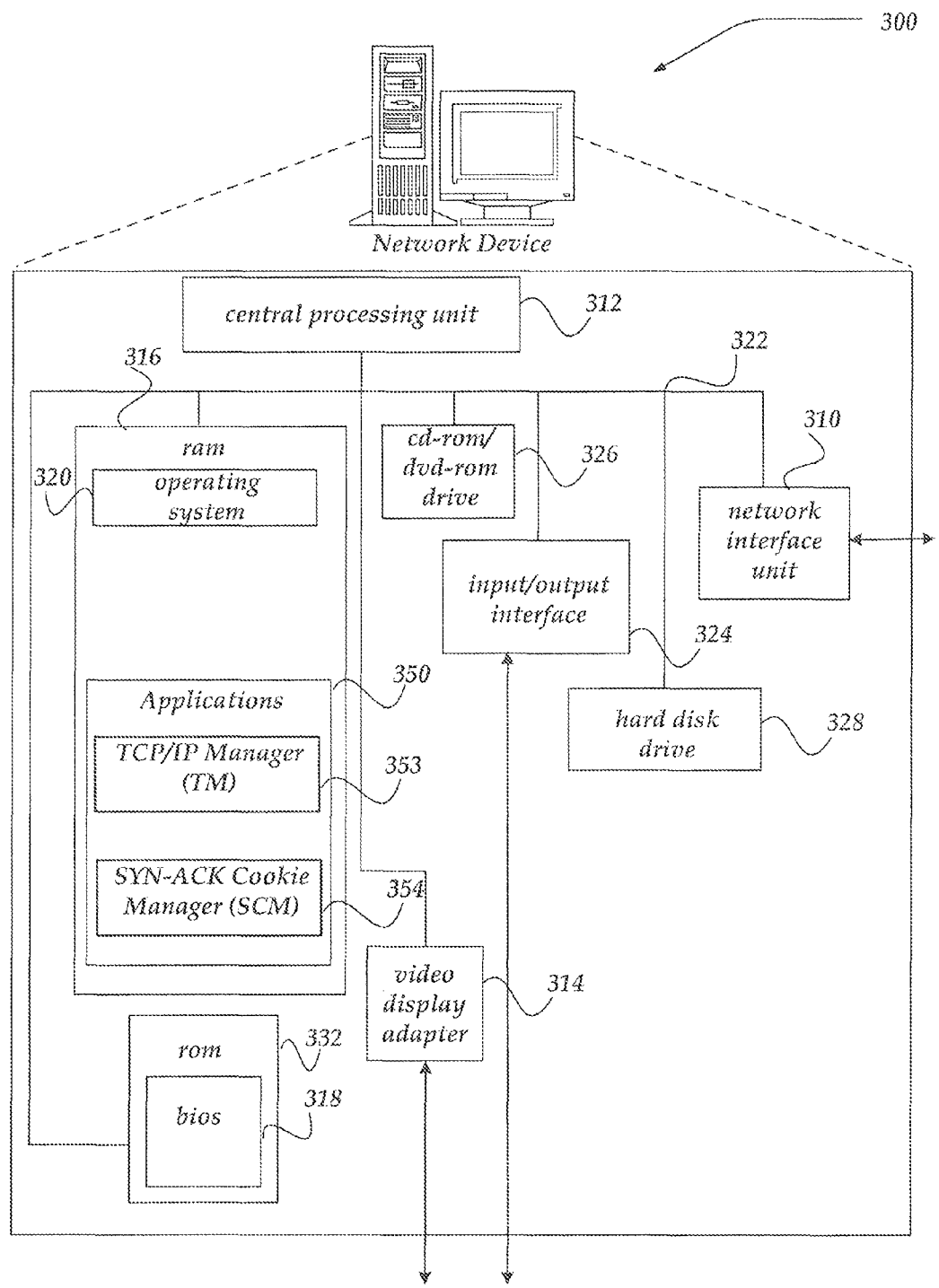
FIG. 3 illustrates one embodiment of a network device for managing SYN-ACK cookies.

FIG. 3 shows one embodiment of a network device, according to one embodiment of the invention. Network device 300 may include many more or less components than those shown. The components shown, however, are sufficient to disclose an illustrative embodiment for practicing one or more embodiments of the invention. Network device 300 may represent, for example, TMD 120 and/or second client device 104 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Network device 300 also includes applications 350, TCP/IP Manager (TM) 353, SYN-ACK Cookie Manager (SCM) 354, which may be expressed as one or more executable instructions stored at one or more locations within RAM 316, although the instructions could be stored elsewhere.

As illustrated in FIG. 3, network device 300 also can communicate with the Internet, or some other communications network via network interface unit 310, which is constructed for use with various communication protocols including the TCP/IP protocol. Network interface unit 310 is sometimes known as a transceiver, transceiving device, or network interface card (NIC).

The mass memory 316, 326, 328, 332 described herein and shown in FIG. 3 illustrates another type of computer-readable media, namely computer storage media. Computer storage media may include volatile, nonvolatile, removable, and non-removable media implemented in any method or technology for storage of information, such as computer readable instructions, data structures, program modules, or other data, which may be obtained and/or executed by CPU 312 to perform one or more portions of process 400 FIG. 4, for example. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store other types of program code and data as applications 350, which may be are loaded into mass memory and run on operating system 320. Examples of application 350 may include email client/server programs, routing programs, schedulers, calendars, database programs, word processing programs, HTTP programs, RTSP programs, traffic management programs, security programs, and any other type of application program.

Network device 300 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, network device 300 may further include applications that support virtually any secure connection, including TLS, TTLS, EAP, SSL, IPSec, and the like.

Network device 300 may also include input/output interface 324 for communicating with external devices, such as a mouse, keyboard, scanner, or other input/output devices not shown in FIG. 3. Likewise, network device 300 may further include additional mass storage facilities such as CD-ROM/DVD-ROM drive 326 and hard disk drive 328. Hard disk drive 328 may be utilized to store, among other things, application programs, databases, and the like in the same manner as the other mass memory components described above.

In one embodiment, the network device 300 may include at least one Application Specific Integrated Circuit (ASIC) chip (not shown) coupled to bus 322. The ASIC chip can include logic that performs some or all of the actions of network device 300. For example, in one embodiment, the ASIC chip can perform a number of packet processing functions for incoming and/or outgoing packets. In one embodiment, the ASIC chip can perform at least a portion of the logic to enable the operation of TCP/IP Manager TM 353, SCM 354, or any other components.

In one embodiment, network device 300 can further include one or more field-programmable gate arrays (FPGA) (not shown), instead of, or in addition to, the ASIC chip. A number of functions of network device 300 can be performed by the ASIC chip, the FPGA, by CPU 312 with instructions stored in memory, or by any combination of the ASIC chip, FPGA, and a CPU.

TM 353 includes any component configured to manage a TCP/IP connection. TM 353 may initiate a TCP/IP request from, for example, one of applications 350, operating system 320, a request received over network interface 310, or the like. TM 353 may create a SYN message, according to, for example, RFC 793. TM 353 may request from SYN-ACK cookie manager (SCM) 354 a SYN-ACK cookie. TM 353 may include the SYN-ACK cookie within the SYN message and may continue with the TCP/IP handshake protocol (e.g., send the SYN message over network interface 310). If a SYN-ACK message is received over, for example, network interface 310, TM 353 may parse the SYN-ACK message, or otherwise retrieve an ACK sequence number within the SYN-ACK message. TM 353 may send the ACK sequence number and/or a version of the sequence number (e.g., the sequence number minus one) to SYN-ACK cookie manager 354. TM 353 may receive a confirmation that the sequence number is a valid SYN-ACK cookie. Based on this received confirmation, TM 353 may continue with the TCP/IP handshake protocol, establish a TCP/IP connection over network interface 310, or the like.

In one embodiment, TM 353 may facilitate a TCP/IP connection between at least two network devices, over for example, network interface 310. In one embodiment, TM 353 may receive a SYN message from a client device over network interface 310, and may map a sequence number within the received SYN message with a SYN-ACK cookie generated by TM 353. TM 353 may forward SYN, SYN-ACK and/or ACK messages and/or other messages between the client and server for a TCP/IP handshake protocol. During the forwarding, TM 353 may map sequence numbers to SYN-ACK cookies. For example, a SYN-ACK cookie (plus one) within a SYN-ACK message received from a server may be mapped to a sequence number (plus one), appropriate for forwarding in a SYN-ACK message to the client device. Mappings between sequence numbers and SYN-ACK cookies may be stored in any mass memory within network device, 300, for example. One process for forwarding SYN, SYN-ACK and/or ACK messages is described in more detail in FIG. 5B, below.

In another embodiment, TM 353 may establish a first network connection between a client device and network device 300. The first network connection may include any type of connection, including any OSI Level 4 protocol connection, TCP/IP, UDP, RTSP, HTTP, SSL, or the like. TM 353 may establish a TCP/IP connection with a server device using a modified TCP handshake protocol, and may forward messages between the client device and the server device, between the first network connection and the TCP/IP connection, or the like.

SCM 354 includes any component configured to manage state information and/or cryptographic information associated with a network device (e.g., including network device 300). SCM 354 may receive a secret key over network interface 310, may generate the secret key, and/or may otherwise manage the secret key. SCM 354 may generate a SYN-ACK cookie based on the secret key and/or other information about a network device and/or a request for a TCP/IP connection. For example, SCM 354 may receive an IP address of network device 300 from operating system 320, may receive an IP address of the recipient of the TCP/IP connection, or the like. In any case, a generated SYN-ACK cookie may be sent to TM 353 for further processing. SCM 354 may also decrypt a possible SYN-ACK cookie, may determine if information within the SYN-ACK cookie matches information about a network device and/or the request for the TCP/IP connection. SCM 354 may send confirmation of the match (e.g., validity of the SYN-ACK cookie) to TM 353 for further processing. In one embodiment, operations of TM 353 and/or SCM 354 may be performed by process 400 of FIG. 4.

Generalized Operation

Figure 4:
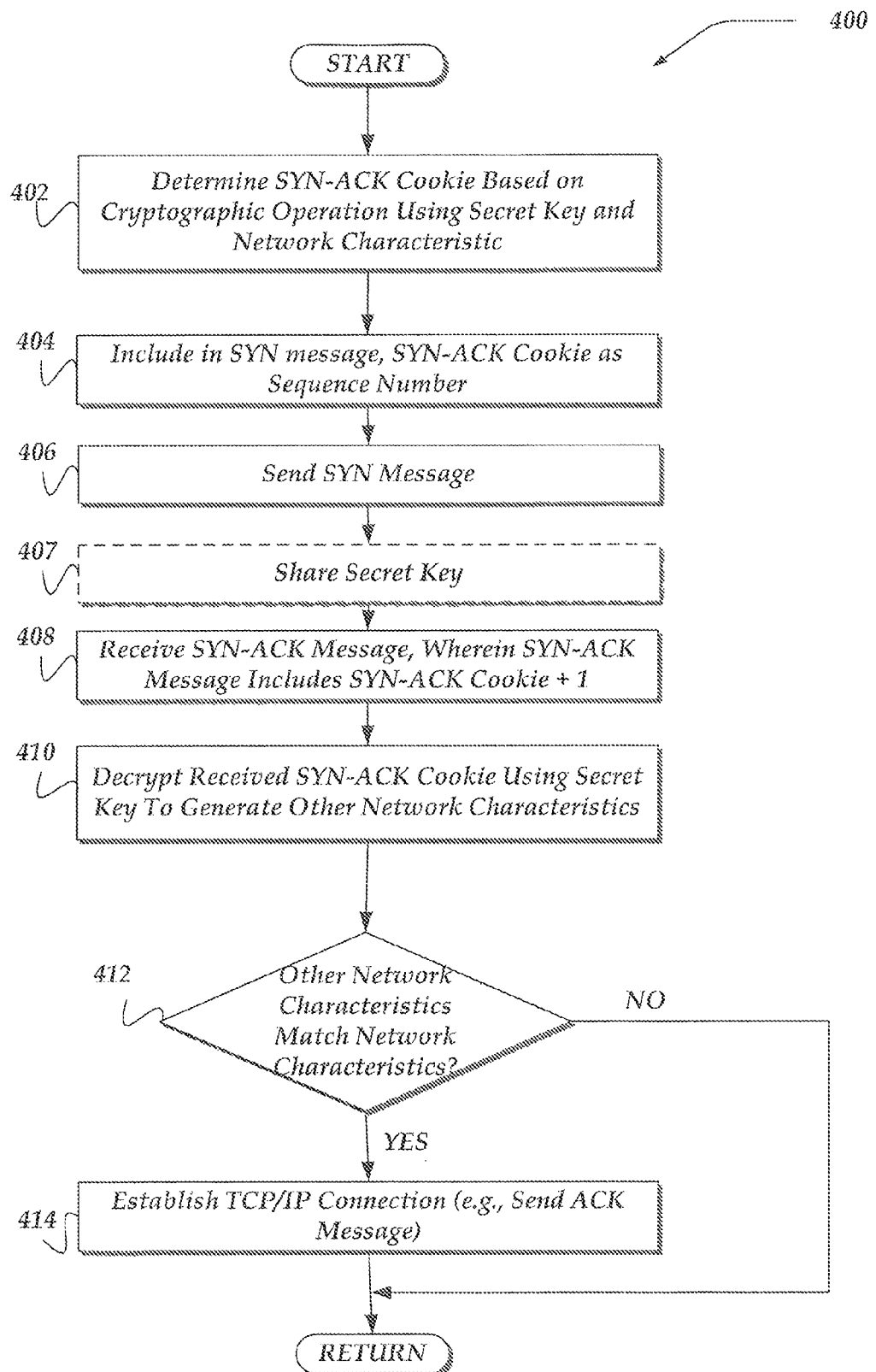
FIG. 4 illustrates a logical flow diagram generally showing one embodiment of a process for managing SYN-ACK cookies.

The operation of certain aspects of the invention will now be described with respect to FIG. 4. FIG. 4 illustrates a logical flow diagram generally showing one embodiment of a process for managing content over a network. Process 400 of FIG. 4 may be implemented, for example, within TMD 120 and/or second client device 104 FIG. 1.

Process 400 begins, after a start block, at block 402, a SYN-ACK cookie is determined based on cryptographic operation using a secret key and a network characteristic. The cryptographic operation may be based on any cryptographic method, including a symmetric key algorithm, an asymmetric key algorithm (public-key cryptography), RSA, a cryptographic hash functions, Data Encryption Standards (DES), triple-DES, Advanced Encryption Standard (AES), or the like. The network characteristic may include the IP address of the client, the port number of the client, the IP address of the server, the port number of the server, or the like.

At block 404, the SYN-ACK cookie is included in a SYN message as the as sequence number of the SYN message. The SYN-ACK cookie may be stored in a TCP/TCP segment of the SYN message.

At block 406, the SYN message is sent. The SYN message is sent within the TCP/IP protocol. The SYN message may be sent by the client to the server after the passive open is performed. The server receives and reads the SYN message. The server may retrieve the SYN-ACK cookie from the appropriate TCP/IP segment of the SYN message. The server may initialize session information associated with the SYN message and/or SYN-ACK cookie received in the SYN message. The server may then respond with the SYN-ACK message. The SYN-ACK message may include an acknowledgement number. In one embodiment, the acknowledgement number may be a SYN-ACK cookie. In another embodiment, the acknowledgement number may be an arbitrary number. The server may also store the received sequence number (e.g., SYN-ACK cookie) plus one in a field different than the acknowledgement number in the SYN-ACK message. The SYN-ACK message may then be sent to the client.

At block 407, the secret key may be shared between two components. In one embodiment, the secret key may be shared between the client and another client, a component within the client and another component (e.g., within the client), an active component and a standby component in a fail-over configuration, or the like. Referring briefly to FIG. 2, in one embodiment, the component may be active 222, and the other component may be standby 224 of the coupled pair 220. The secret key and/or other state information may be sent to standby 224 over a secured channel 250, for example. Standby 224 may receive the secret key. In one embodiment, block 407 may not be performed, and processing instead continues to block 408. In another embodiment, error detector 226 may detect that active 222 may be improperly operating, or otherwise unresponsive. For example, active 222 may not send data within a period of time. In this case, error detector 226 may activate standby 224. Standby 224 may receive, process, and send data. Referring back to FIG. 4, standby 224 may be enabled to perform steps 408, 410, 412 and/or 414 if the component and/or client is determined to have failed or is otherwise unresponsive.

At block 408, the SYN-ACK message is received, wherein the SYN-ACK message includes the sequence number plus one (e.g., SYN-ACK cookie plus one). The SYN-ACK message may be received by the client. The client may retrieve the sequence number plus one (e.g., SYN-ACK cookie plus one). The client may subtract one from the sequence number to retrieve a (possibly valid) SYN-ACK cookie.

At block 410, the received SYN-ACK cookie is validated using the secret key to generate other network characteristics. The validation may use any cryptographic method, including a symmetric key algorithm, an asymmetric key algorithm (public-key cryptography), RSA, a cryptographic hash functions, Data Encryption Standards (DES), triple-DES, Advanced Encryption Standard (AES), or the like.

At decision block 412, it is determined whether the other network characteristics match the network characteristics. If the other network characteristics and the network characteristics match then the SYN cookie is determined to be valid. In another embodiment, the SYN-ACK cookie may be encrypted with a one way encryption. In this embodiment, the network characteristics may be encrypted using the secret key. If the result of the encryption matches the received SYN-ACK cookie, then the SYN-ACK cookie is determined to be valid. In any case, if the SYN-ACK cookie is valid, processing continues to block 414. If the SYN-ACK cookie is not valid, processing returns to a calling process for further processing.

At block 414, the TCP/IP Protocol connection is established (e.g., finished). In one embodiment, the remaining portion of the TCP/IP handshake protocol may be completed. For example, an ACK message may be sent. The server may receive the ACK message, processes the ACK message and the TCP/IP connection may be established between the client and server. Data may subsequently be sent over the TCP/IP connection. Processing then returns to a calling process for further processing.

Illustrative Signal Flow

Figure 5A:
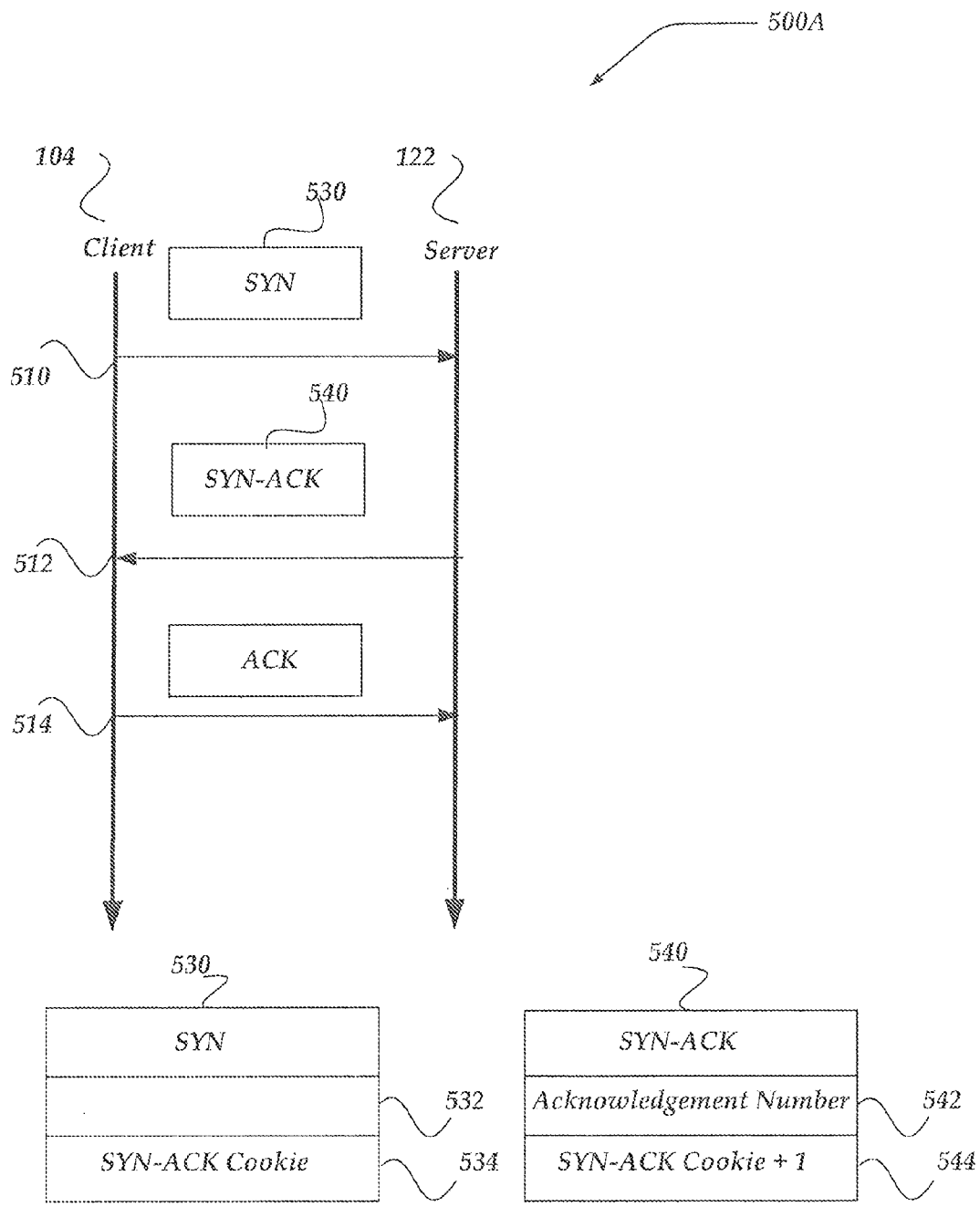
FIGS. 5A and 5B show signal flows generally showing one embodiment of a process for managing SYN-ACK cookies.

The operation of certain aspects of the invention will now be described with respect to FIGS. 5A and 5B. FIG. 5A shows a signal flow generally showing one embodiment of a process for managing content over a network. As shown, at time point 510, client 103 sends SYN message 530 to server 122. SYN message 530 may have several data fields, including data field 532 and 534. Data field 532 may store, for example the sequence number. As shown, client 103 stores a SYN-ACK cookie, as described herein, into data field 534. After server 122 receives SYN message 530, server 122 responds with SYN-ACK message 540. As shown, SYN-ACK message 540 may include several data fields, including data field 542 and data field 544. Server 122 may store data in the data fields. As shown, data field 542 may include an acknowledgement number. In one embodiment, acknowledgement number may correspond to a SYN-ACK cookie generated by client 104. Data field 544 may include the received sequence number 544 plus one. At time point 512, client 104 receives SYN-ACK message 540. Client 104 may retrieve a sequence number from data field 544, may subtract one from the retrieved sequence number, determine whether the retrieved sequence number is a valid SYN-ACK cookie, or the like. If the retrieved sequence number is a valid SYN-ACK cookie (e.g., is validated by applying one or more cryptographic operations), then an ACK message may be sent between client 103 and server 122. After receiving the ACK message, a TCP/IP connection is established between client 103 and server 122. If the retrieved sequence number is not valid/invalid, then no ACK message is sent, and the TCP/IP connection is not established.

Figure 5B:
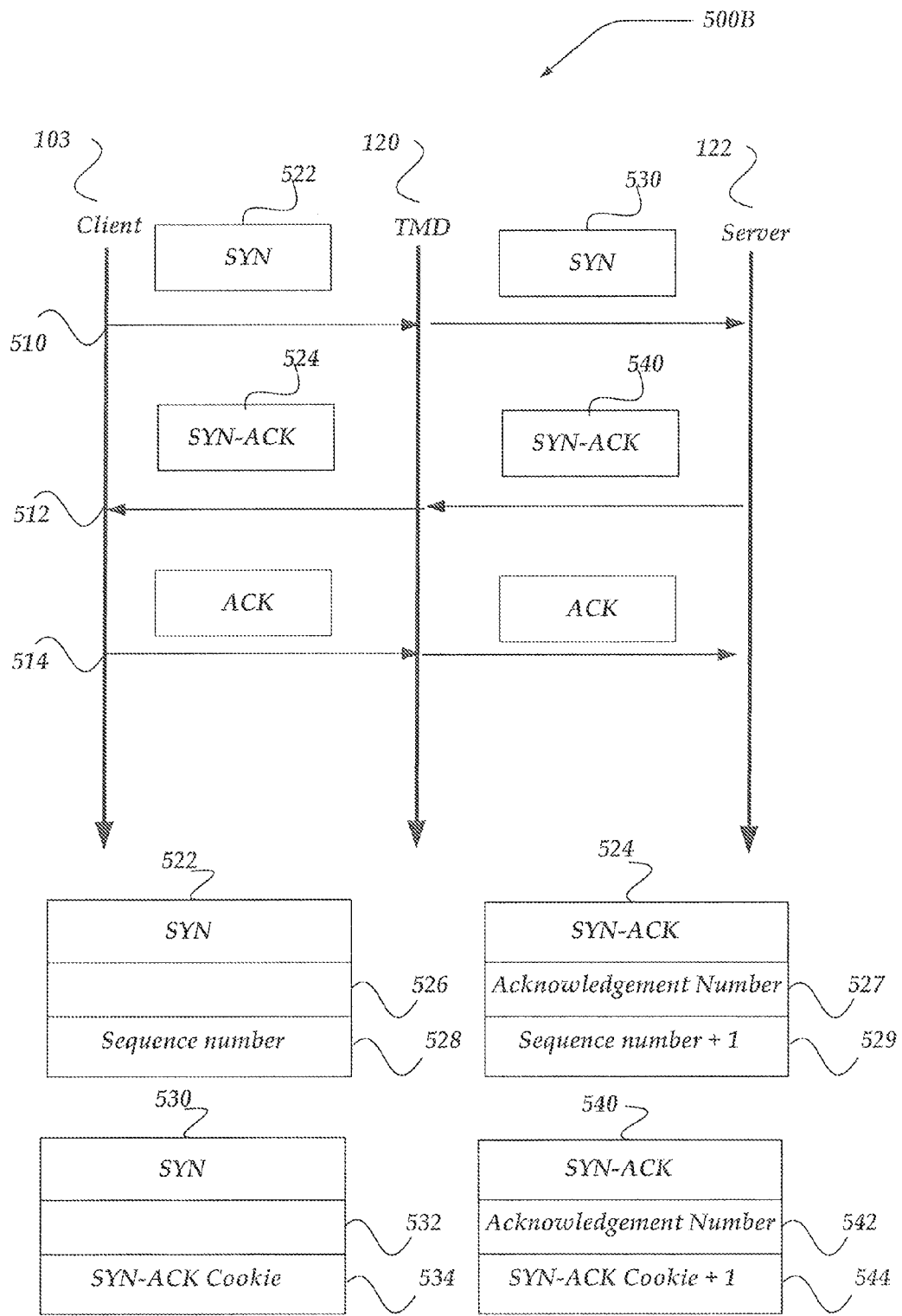
Figure 1:
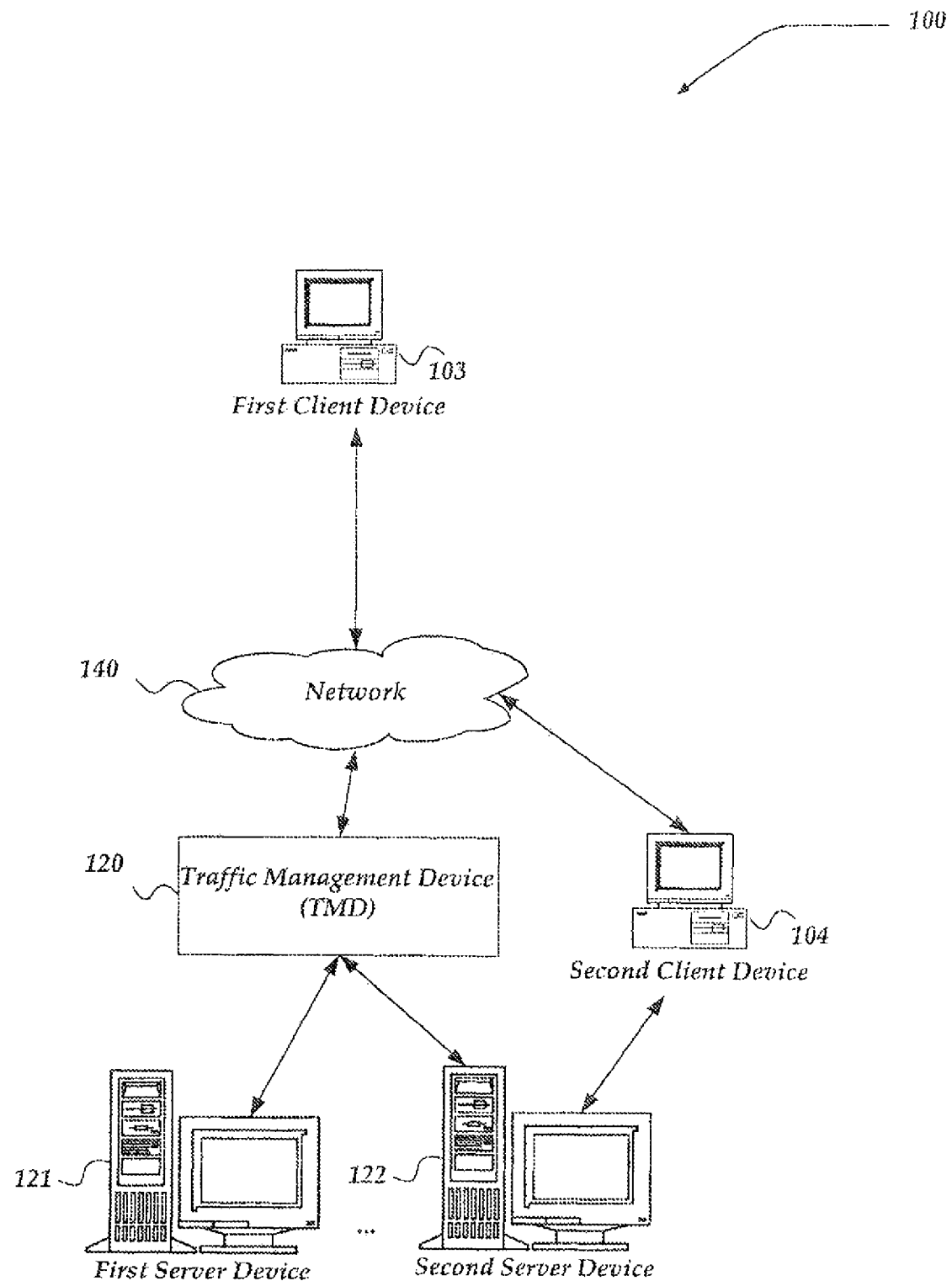

FIG. 5B shows another signal flow generally showing one embodiment of a process for managing content over a network. As shown, at time point 510, client 103 sends a (client-based) SYN message 522 to TMD 120. TMD 120 may read, parse, decrypt, or otherwise inspect the SYN message 522. TMD 120 may retrieve the sequence number from data field 528. TMD 120 may create another SYN message 530. In SYN message 530, TMD 120 may include a SYN-ACK cookie in data field 534. TMD 120 may maintain a mapping between the sequence number from data field 528 and the SYN-ACK cookie from data field 534. Server 122 may receive SYN message 530, and in response, may send SYN- ACK message 540. Included in SYN-ACK message 540, may be a possible SYN-ACK cookie plus one in data field 544. TMD 120 may receive this SYN-ACK message 540 and may confirm of the data in data field 544 is valid, as described above. If the information is valid, TMD 120 may find the associated sequence number for the received SYN-ACK cookie. TMD may create a (client based) SYN-ACK message 524 and may include the associated sequence number plus one in data field 529, and may send SYN-ACK message 524 to client 103 at time point 512. Client 103 may send an ACK message to TMD 120 at time point 514. TMD 120 may forward this ACK message (or a modified version of this ACK message) to server 122. After receiving the ACK message, the TCP/IP connection between client 103 and server 122, with TMD 120 as an intermediary, is established.

SYN message 530 may have several data fields, including data field 532 and 534. Data field 532 may store, for example sequence number. As shown, client 103 stores a SYN-ACK cookie, as described herein, into data field 534. After server 122 receives SYN message 530, server 122 responds with SYN-ACK message 540. As shown, SYN-ACK message 540 may include several data fields, including data field 542 and data field 544. Server 122 may store data in the data fields. As shown, data field 542 may include an acknowledgement number. Data field 544 may include the received sequence number 544 plus one. At time point 512, client 104 receives SYN-ACK message 540. Client 104 may retrieve a sequence number from data field 544, may subtract one from the retrieved sequence number, determine whether the retrieved sequence number is a valid SYN-ACK cookie, or the like. If the retrieved sequence number is a valid SYN-ACK cookie (e.g., is validated by applying one or more cryptographic operations), then an ACK message may be sent between client 103 and TMD 120 and/or server 122. In one embodiment, a TCP/IP connection may be established between client device 103 and server 122 with TMD 120 as an intermediary. In another embodiment, a first TCP/IP connection may be established between client device 103 and TMD 120. Information received through the first TCP/IP connection may be forwarded over a second TCP/IP connection that is established between TMD 120 and server 122. After receiving the ACK message, a TCP/IP connection is established between client 103 and server 122. If the retrieved sequence number is not valid/invalid, then no ACK message is sent, and the TCP/IP connection is not established.

It will be understood that each block of a flowchart illustration need not be limited in the ordering shown in the illustration, and may be performed in any ordering, or even performed concurrently, without departing from the spirit of the invention. It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A system for managing network traffic, comprising:
   a first component that receives network traffic over a network and performs actions comprising:
      determining a SYN-ACK cookie based in part on a cryptographic operation using a secret key and at least one state information;
      including the SYN-ACK cookie in a SYN message to a server device;
      sending the SYN message to the server device to initiate a Transmission Control Protocol/Internet Protocol (TCP/IP) connection with the server device; and
   a second component that receives network traffic over the network, is in communication with the first component to receive the secret key, and when the first component is detected in fail-over mode as having an error, then the second component performing actions, comprising:
      receiving a SYN-ACK message that comprises a modified SYN-ACK cookie;
      determining whether the modified SYN-ACK cookie is valid based on another cryptographic operation using the secret key and the modified SYN-ACK cookie; and
      selectively establishing the TCP/IP connection to forward network traffic to the server device in response to the valid modified SYN-ACK cookie.

2. The system of claim 1, wherein the first and second components are at least one of two different traffic management devices (TMD), applications executing within one or more microprocessors, or two different Application Specific Integrated Circuits within a same TMD.

3. The system of claim 1, further comprising:
   an error detector component that performs actions, including:
      in response to detecting an error, failure, or non-responsiveness from the first component, activating the second component such that network traffic is re-routed from the first component towards the second component.

4. The system of claim 1, wherein the second component is further operable to perform actions comprising:
   receiving a client-based SYN message from a client device;
   mapping a sequence number within the client-based SYN message to the SYN-ACK cookie; and
   generating a client-based SYN-ACK message for sending to the client device, wherein the client-based SYN-ACK message includes a modified sequence number.

5. The system of claim 4, wherein the modified sequence number is modified by the first component or the second component using the mapping.

6. The system of claim 1, wherein the first component is further operable to perform actions comprising:
   receiving a request from a client device for another TCP/IP connection to the server device, wherein the TCP/IP connection is configured to forward network traffic from the other TCP/IP connection to the server device.

7. The system of claim 1, wherein the SYN-ACK cookie is included in the SYN messages as a sequence number of the SYN message.

8. A traffic management device (TMD) for managing communication over a network, comprising:
    a network communication component that sends or receives network traffic over the network; and
    one or more processors having thereon:
    an active component that performs one or more actions, including:
    receiving a SYN message from a client device;
    determining a SYN-ACK cookie based in part on a cryptographic operation using a secret key and state information of the TMD; and
    sending a modified SYN message to initiate a connection with a server device, wherein the modified SYN message is based on the received SYN message and includes the SYN-ACK cookie; and
    a standby component in communication with the active component to receive the secret key, operable to perform actions when it is determined that the active component is in fail-over mode as having an error, the actions comprising:
    receiving from the server device a SYN-ACK message that comprises a modified SYN-ACK cookie; and
    establishing the connection with the server device, if the SYN-ACK message includes a valid modified SYN-ACK cookie which is determined based on another cryptographic operation using at least the secret key and the modified SYN-ACK cookie.

9. The TMD of claim 8, wherein the active component and the standby component are further configured to operate within one or more application specific integrated circuits (ASICs), one or more field-programmable gate arrays (FPGA), one or more central processing units (CPUs) with instructions stored in memory, or a combination of ASIC chips, FPGA, or CPUs.

10. The TMD of claim 8, further comprising:
    an error detector operating within one or more processors to perform actions, including:
    detecting an error within the active component; and
    when the error is detected, inhibiting further actions by the active component, and routing network traffic to the standby component.

11. The TMD of claim 8, wherein the modified SYN-ACK cookie includes the SYN-ACK cookie plus an incremental value.

12. The TMD of claim 8, wherein the at least one state information further comprises at least one of an IP address of a client device, a port number of the client device, an IP address of the server device, or a port number of the server device.

13. The TMD of claim 8, wherein when the modified SYN-ACK cookie is determined to be invalid based on the cryptographic operation using the secret key, dropping the SYN-ACK message.

14. The TMD of claim 8, wherein at least one of the active or the standby component maps a sequence number within the SYN message to the SYN-ACK cookie.

15. The TMD of claim 8, wherein the standby component further modifies the received SYN-ACK message by replacing the modified SYN-ACK cookie with a modified sequence number and forwarding the modified SYN-ACK message towards the client device.

16. An apparatus for managing network traffic over a network, comprising:
    one or more processors having an active component that performs actions, including:
    receiving a SYN message from a client device;
    determining a SYN-ACK cookie based in part on a cryptographic operation using a secret key and at least one state information;
    modifying the SYN message with the SYN-ACK cookie;
    sending the modified SYN message that includes the SYN ACK cookie to a server device to initiate a Transmission Control Protocol/Internet Protocol (TCP/IP) connection with the server device;
    one or more other processors having a standby component in communication with the active component to receive the secret key, and when it is determined that the active component is in fail-over mode as having an error, performs actions including:
    receiving a SYN-ACK message that comprises a modified SYN-ACK cookie;
    determining whether the modified SYN-ACK cookie is valid based on another cryptographic operation using the secret key and the modified SYN-ACK cookie; and
    selectively establishing the TCP/IP connection to forward network traffic to the server device in response to the valid modified SYN-ACK cookie; and
    one or more additional processors having an error detector that performs actions, including directing network traffic towards the standby component when the active component is determined to be in a fail-over mode.

17. The apparatus of claim 16, wherein the standby component performs actions, further including:
    mapping a sequence number within the SYN message to the SYN-ACK cookie.

18. The apparatus of claim 16, wherein the active component performs actions, further including:
    receiving a request from the client device for another TCP/IP connection to the server device, wherein the TCP/IP connection is configured to forward network traffic from the other TCP/IP connection to the server device.

19. The apparatus of claim 16, wherein the modified SYN-ACK cookie is the SYN-ACK cookie incremented by a value.

20. The apparatus of claim 16, wherein the standby component further modifies the received SYN-ACK message by replacing the modified SYN-ACK cookie with a modified sequence number and forwarding the modified SYN-ACK message towards the client device.

21. The apparatus of claim 16, wherein modifying the SYN message comprises replacing a sequence number from the client device with the SYN-ACK cookie.

22. A method, comprising:
    receiving, by an active component, a SYN message over a network from a client device;
    determining, by the active component, a SYN-ACK cookie based in part on a cryptographic operation using a secret key and state information; and
    sending, by the active component, a modified SYN message to initiate a network connection with a server device, wherein the modified SYN message is based on the received SYN message and includes the SYN-ACK cookie; and
    receiving at a standby component the secret key, and when it is determined that the active component is in fail-over mode as having an error, performing actions by the standby component, including:
    receiving from the server device a SYN-ACK message that comprises a modified SYN-ACK cookie; and establishing the network connection with the server device, if the SYN-ACK message includes a valid modified SYN-ACK cookie which is determined based on another cryptographic operation using at least the secret key and the modified SYN-ACK cookie.

23. The method of claim 22, further comprising:
detecting an error within the active component; and
when the error is detected, inhibiting further actions by the active component, and routing network traffic to the standby component.

24. A computer-readable storage device having executable instructions stored thereon that when installed within one or more computing devices perform actions, comprising:
within an active component:
receiving a SYN message over a network from a client device;
determining a SYN-ACK cookie based in part on a cryptographic operation using a secret key and state information; and
sending, a modified SYN message to initiate a network connection with a server device, wherein the modified SYN message is based on the received SYN message and includes the SYN-ACK cookie; and
within a standby component:
receiving at a standby component the secret key; and
when it is determined that the active component is in fail-over mode as having an error:
receiving from the server device a SYN-ACK message that comprises a modified SYN-ACK cookie; and
establishing the network connection with the server device, if the SYN-ACK message includes a valid modified SYN-ACK cookie which is determined based on another cryptographic operation using at least the secret key and the modified SYN-ACK cookie.

25. The computer-readable storage device of claim 24, wherein the active component and the standby component are installed on at least one of two different traffic management devices (TMD), are applications installed within one or more microprocessors, or are two different Application Specific Integrated Circuits.

26. The computer-readable storage device of claim 24, wherein
detecting an error within the active component; and
when the error is detected, inhibiting further actions by the active component, and routing network traffic to the standby component.

* * * * *

UNITED STATES PATENT AND TRADEMARK OFFICE
CERTIFICATE OF CORRECTION

| | |
|---|---|
| PATENT NO. | : 8,200,957 B1 |
| APPLICATION NO. | : 13/041111 |
| DATED | : June 12, 2012 |
| INVENTOR(S) | : Mukerji et al. |

It is certified that error appears in the above-identified patent and that said Letters Patent is hereby corrected as shown below:

In the drawings delete sheet figure 1 of 6 and insert figure 1 of 6 consisting of figure 1 as attached.

In column 4, line 44, delete "to ," and insert -- to, --, therefor.

In column 4, line 52, delete "Mobil" and insert -- Mobile --, therefor.

In column 7, line 43, delete "form" and insert -- from --, therefor.

In column 7, line 62, delete "(ASIC)s" and insert -- (ASIC) --, therefor.

In column 9, line 7, delete "400 FIG. 4," and insert -- 400 of FIG. 4, --, therefor.

In column 11, line 2, delete "104 FIG. 1." and insert -- 104 of FIG. 1. --, therefor.

In column 11, line 15, after "as the" delete "as".

In column 16, lines 10-11, in Claim 16, delete "SYN ACK" and insert -- SYN-ACK --, therefor.

In column 16, line 18, in Claim 16, delete "actions" and insert -- actions, --, therefor.

Signed and Sealed this
Thirty-first Day of July, 2012

David J. Kappos
*Director of the United States Patent and Trademark Office*